US012804367B2

(12) United States Patent
Milheiro Mendes

(10) Patent No.: US 12,804,367 B2
(45) Date of Patent: Nov. 17, 2026

(54) METHOD FOR OPTIMIZING A MODIFICATION OF AN AD-HOC-EDGE NETWORK WITH A RESOURCE-AWARE SERVICE ALLOCATION STRATEGY AND A SYSTEM FOR EXECUTING SUCH A METHOD

(71) Applicant: Airbus S.A.S., Blagnac (FR)

(72) Inventor: Paulo Jorge Milheiro Mendes, Blagnac (FR)

(73) Assignee: Airbus S.A.S., Blagnac (FR)

( * ) Notice: Subject to any disclaimer, the term of this patent is extended or adjusted under 35 U.S.C. 154(b) by 285 days.

(21) Appl. No.: 18/581,752

(22) Filed: Feb. 20, 2024

(65) Prior Publication Data

US 2024/0284153 A1 Aug. 22, 2024

(30) Foreign Application Priority Data

Feb. 21, 2023 (EP) .................................... 23157852

(51) Int. Cl.
*H04W 4/50* (2018.01)
*H04W 72/21* (2023.01)
*H04W 84/18* (2009.01)

(52) U.S. Cl.
CPC ............. *H04W 4/50* (2018.02); *H04W 72/21* (2023.01); *H04W 84/18* (2013.01)

(58) Field of Classification Search
CPC ........ H04W 4/50; H04W 72/21; H04W 84/18
USPC ....................................................... 455/414.1
See application file for complete search history.

(56) References Cited

U.S. PATENT DOCUMENTS

2021/0117249 A1 4/2021 Doshi et al.
2025/0373888 A1* 12/2025 Wang ............... H04N 21/43615

OTHER PUBLICATIONS

Wang Yimeng et al: "IndustEdge: A Time-Sensitive Networking Enabled Edge-Cloud Collaborative Intelligent Platform for Smart Industry", IEEE Transactions on Industrial Informatics, IEEE Service Center, New York, NY, US, vol. 18, No. 4 , Sep. 8, 2021 (Sep. 8, 2021), pp. 2386-2398, XP011896530.

Kaur Kiranpreet et al: "Latency and network aware placement for cloud-native 5G/6G services", 2022 IEEE 19th Annual Consumer Communications & Networking Conference (CCNC), IEEE, Jan. 8, 2022 (Jan. 8, 2022), pp. 114-119, XP034083424.

(Continued)

*Primary Examiner* — Michael Thier
(74) *Attorney, Agent, or Firm* — Lerner David LLP

(57) ABSTRACT

A method for optimizing a modification of an ad-hoc-edge network with a resource-aware service allocation strategy is described for deployment of a multitude of correlated microservices, which define a service, on an ad-hoc-edge network topology including a multitude of edge devices and a multitude of mobile computational devices with limited resources, interconnected in an ad-hoc manner. The services are thereby not deployed as a monolithic element in a single computational device, but as a set of correlated microservices, each of which can be deployed and executed in a different mobile computational device. Hence, an efficient allocation and scheduling of computational tasks among the set of resource constrained devices, for example energy consumption, ensure the proper execution of the overall service.

14 Claims, 2 Drawing Sheets

(56) References Cited

OTHER PUBLICATIONS

Jiao Zhiqiang et al: “C4ISR Service Deployment Based on an Improved Quantum Evolutionary Algorithm”, IEEE Transactions on Network and Service Management, IEEE, USA, vol. 18, No. 2, Jan. 26, 2021 (Jan. 26, 2021), pp. 2405-2419, XP011860408.
Lu Duo To et al : “A Secure Microservice Framework for IoT”, 2017 IEEE Symposium on Service-Oriented System Engineering (SOSE), IEEE, Apr. 6, 2017 (Apr. 6, 2017) , pp. 9-18, XP033105212.
EESR for Application No. 23157852.7 dated Jul. 21, 2023. 14 pgs.
Hossain MD, et al., “Fuzzy Based Collaborative Task Offloading Scheme in the Densely Deployed Small-Cell Networks with Multi-Access Edge Computing”. Applied Sciences. Apr. 2020; 10(9):3115. https://doi.org/10.3390/app10093115.
A. A. Ashraf Ateya, A. , et al., “Energy- and Latency-Aware Hybrid Offloading Algorithm for UAVs,” in IEEE Access, vol. 7, pp. 37587-37600, Mar. 2019, doi: 10.1109/ACCESS.2019.2905249.
B. Liu, et al., “Online Computation Offloading and Traffic Routing for UAV Swarms in Edge-Cloud Computing,” in IEEE Transactions on Vehicular Technology, vol. 69, No. 8, pp. 8777-8791, Aug. 2020, doi: 10.1109/TVT.2020.2994541.

* cited by examiner

METHOD FOR OPTIMIZING A MODIFICATION OF AN AD-HOC-EDGE NETWORK WITH A RESOURCE-AWARE SERVICE ALLOCATION STRATEGY AND A SYSTEM FOR EXECUTING SUCH A METHOD

FIELD OF THE INVENTION

The present invention relates to a method for optimizing a modification of an ad-hoc-edge network with a resource-aware service allocation strategy and a system for executing such a method. In particular, the invention relates to a method for optimizing a modification of an ad-hoc-edge network with a resource-aware service allocation strategy for deployment of a multitude of correlated microservices, which define a service, on an ad-hoc-edge network topology comprising a multitude of edge devices and a multitude of mobile computational devices with limited resources, interconnected in an ad-hoc manner, and a system for executing such a method.

BACKGROUND OF THE INVENTION

The increased usage of mobile data services is having a significant impact on the internet architecture. The development of latency-critical services, such as video stream analysis and augmented reality, requires extensive real-time computing. In this context, Mobile Edge Computing, MEC, provides computing services at the network edge, aiming to improve the performance required by latency-critical services, mostly based on data collected by mobile users and vehicles. However, MEC relies on a set of predefined edge devices used to deploy monolithic service, since service deployment does not change according to the needs of different services and dynamic environmental setups. Being deployed at the edge of a mobile network, services may fail to provide the required quality when the edge device is too far away from the service consumers.

Thus, edge computing concepts are being developed to reduce the latency of cloud services based on a distributed computing paradigm that brings computation and data storage closer to the location where it is needed, in order to improve response times and save bandwidth.

Processing services in edge nodes, and not in a cloud, brings several benefits like relieving the limitations coming from Internet bandwidth and reducing energy consumption in datacenters. By allowing processing data in a node that is closer to network edges, rather than in the data center, edge computing contributes to decrease the Internet delay based on closer communication distance. Moreover, by keeping data close to the sources, private data does not need to be uploaded to data centers.

Edge computing frameworks, such as the Multi-access Edge Computing developed by ETSI, focus on the relationship between edge and cloud to achieve lower delay and higher bandwidth. However, MEC does consider scenarios in which different edge devices may cooperate with computational devices located in the far edge, within mobile networks encompassing vehicles, drones, aircrafts and even satellites. This cooperation may solve some of the limitations of edge computing, since due to the short range of waves used in 5G, edges may still be too far away from the service consumer to be able to support the required low delay.

In such a cooperation scenario between edge devices and far edge devices located in ad-hoc mobile networks, it is important to rely on computation allocation and scheduling frameworks and algorithms able to efficiently distribute a set of interconnected service tasks among a set of ad hoc nodes.

In this context several computational offloading schemes have been proposed, such as to support remote sensing in drone swarms. The proposed scheme aims to offload a deep learning-based recognition and Inference task in a networking scenario encompassing one computational device and one edge node. The goal is to minimize the resource consumption computational device, like a the battery power of a drone, while being able to perform the recognition and inference task. However, this scheme is not suitable for an ad-hoc system encompassing a large number of nodes.

When looking at ad-hoc mobile networks, some effort has been made in the context of vehicular mobile edge computing. Some attention has been paid to the investigation of algorithms able to minimize the average computation delay while considering the limitations of vehicle mobility and energy consumption. However, most of these proposals do not take into consideration the resource consumption optimization challenge.

Aiming to tackle this problem, Hossain et al. "Fuzzy based collaborative task offloading scheme in the densely deployed small-cell networks with multi-access edge computing," Applied Sciences, 2020 proposed a novel fuzzy-based collaborative task offloading scheme in order to accommodate more computation workload in the MEC system and so to reduce the dependence on remote cloud. However, it only offloads computing tasks to fixed edge servers, lacking the consideration of mobile computing servers, such as drones, aircraft or satellites.

Looking at a cooperative system between edge devices and mobile ad-hoc devices, a hybrid offloading scheme was proposed in "Energy- and Latency-Aware Hybrid Offloading 378 Algorithm for UAVs" IEEE Access 2019 Transactions on Vehicular Technology 2020, by combining offloading between airborne and ground computational devices, allowing drones to offload its tasks to nearby drones that have sufficient computation power and energy. Tasks can also be offloaded to an edge ground server.

However, these schemes normally assume that ad-hoc devices can directly communicate with edge devices located in a nearby access network. However, this assumption may not stand in scenarios encompassing drone swarms or aircraft that may have intermittent connectivity towards the ground, or a constellation of satellites that would like to avoid using resources to transfer a large amount of raw data to the ground.

Therefore, in order to tackle the ad-hoc-edge-cloud continuum, Liu et al. proposed in "Online Computation Offloading and Traffic Routing for UAV Swarms in Edge-Cloud Computing". IEEE, a joint computation offloading and routing optimization algorithm, which however does not consider the resource limitation challenge and so does not propose a method to fairness allocate computational tasks among a set of nodes.

Nevertheless, in recent years, a growing number of physical objects have been connected to the internet at an unprecedented rate, being able to collect large amounts of data. In this scenario, flying mobile computational devices such as drones, High Altitude Pseudo Satellites, HAPS, and satellites have attracted a lot of attention and have experienced rapid development. Drones have an increasing utilization due to their superiority in maneuverability and cost, being used in data collection scenarios such as express transportation, environment monitoring, and disaster relief. As for satellites, due to their global positioning and ultra-long distance communication, they are particularly essential when sensors and actuators are located in remote areas without service from terrestrial access networks. Moreover, satellites have a central role in all services that rely on earth observation data. This scenario may be extended in the future to exploit other flying vehicles as sources of data, such as Urban Air Mobility vehicles flying over metropolitan areas, and commercial aircrafts.

However, all mobile computational devices, like drones or the like, are operated with limited resources like battery power, bandwidth or latency, meaning that the development of solutions able to exploit the ad-hoc-edge-cloud continuum need to be efficient in terms of resource consumption.

BRIEF SUMMARY OF THE INVENTION

An aspect relates to optimizing a modification of an ad-hoc-edge network with a resource-aware service allocation strategy for deployment of a multitude of correlated microservices, which define a service, on an ad-hoc-edge network topology comprising a multitude of edge devices and a multitude of mobile computational devices with limited resources, interconnected in an ad-hoc manner. In other words, computational allocation schemes over the adhoc-edge-cloud continuum should be applied in order to reduce the resource consumption of mobile computational devices.

According to one aspect, a method for optimizing a modification of an ad-hoc-edge network with a resource-aware service allocation strategy for deployment of a multitude of correlated microservices, which define a service, on an ad-hoc-edge network topology comprising a multitude of edge devices and a multitude of mobile computational devices with limited resources, interconnected in an ad-hoc manner, comprises the following steps:

Gathering, via a Software Defined Networking, SDN—, controller, network information of a current status of the ad-hoc-edge network, Verifying, via the SDN controller, a possibility to accommodate each of the multitude of correlated microservices in the multitude of edge devices and the multitude of mobile computational devices, by verifying:

that a remaining energy of each mobile computational device is sufficient to accommodate an execution time of at least one of the microservices, and/or that a bandwidth of a connection between one mobile computational device and at least one neighboring mobile computational device is sufficient for at least one of the microservices to receive an output of one of a precedent microservice, Creating, via the SDN controller, a multitude of microservice allocation vectors, wherein each microservice allocation vector is assigned to one of the multitude of correlated microservices and to one of the multitude of edge devices or to one of the multitude of mobile computational devices, Validating, via the SDN controller, a deployment of the multitude of correlated microservices based on a genetic operation, via an evolutionary algorithm, in which the service is represented by a multitude of chromosomes, each chromosome comprising a multitude of genes, wherein in each chromosome, each gene represents one corresponding microservice allocation vector, such that each chromosome is a potential candidate that can allocate the multitude of correlated microservices onto the ad-hoc network topology, wherein the quality of each chromosome is estimated based on a corresponding fitness value of the evolutionary algorithm, wherein the fitness value corresponds to the total cost of allocation of the multitude of microservices, Arranging, via the SDN controller, the multitude of chromosomes in descending order according to a corresponding fitness value for each of the multitude of chromosomes, Selecting, via the SDN controller, a chromosome with the highest fitness value representing an optimized allocation of microservices in the ad-hoc network topology, such that a resource consumption in the ad-hoc network is minimized.

As mentioned above, a method for optimizing a modification of an ad-hoc-edge network with a resource-aware service allocation strategy is provided for deployment of a multitude of correlated microservices, which define a service, on an ad-hoc-edge network topology comprising a multitude of edge devices and a multitude of mobile computational devices with limited resources, interconnected in an ad-hoc manner.

The services are thereby not deployed as a monolithic element in a single computational device, but as a set of correlated microservices, each of which can be deployed and executed in a different mobile computational device. Hence, an efficient allocation and scheduling of computational tasks among the set of resource constrained devices, for example energy consumption, are important to ensure the proper execution of the overall service. The method comprises the following steps:

In a first step, via a Software Defined Networking, SDN—, controller, network information of a current status of the ad-hoc-edge network, is gathered. A "Software-defined networking, SDN—, technology" can be understood as an approach to network management that enables dynamic, programmatically efficient network configuration, in order to improve network performance and monitoring, making it more like cloud computing than traditional network management.

In other words, the SDN controller gathers in a certain frequency information about the identity of each of the devices that are part of the overall system, including the ad-hoc devices as well as the edge devices.

This is done based on a broadcast message that collects the identity, e.g. flat ID, of all visited nodes. The following rule is used to assign identifiers:

An odd value to identify an edge device; and an even value to identify an ad hoc device.

The cloud infrastructure is identified by a −1.

The broadcast message is forwarded by the SDN controller over all its interfaces with the indication of the System ID: this is the identifier of the used instantiation of the ad-hoc-edge-cloud system. It is assumed that mobile computational devices, edge devices and cloud devices support virtualization, meaning that resources can be shared among a set of ad-hoc-edge-cloud parallel systems.

In other words, every device belonging to the System ID that receives the broadcast message will first verify if the ID of all its neighbours is already included in the broadcast message header. If so, the device will stop broadcasting the message, add its own ID to the message header and send it back to the SDN controller, representing the source of the broadcast message. If some neighbours are still not included in the broadcast message, the device adds its own ID to the message header and sends it over all the interfaces leading to neighbours that did not receive the broadcast message.

Every time a device adds its ID to a broadcast message header it also adds in the message payload: i) a vector with the IDs of its neighbours and the bandwidth of the communication towards them; ii) information about the energy status of the device.

Thus, based on the information gathering process, the SDN controller builds a graph representation of the System ID, in which each vertex is identified by the device ID, and is weighted based on the energy status of the corresponding device and each link is identified with the ID, or locator, of the neighbor node, and is weighted based on the bandwidth between the neighboring devices.

In a second step, via the SDN controller, a possibility to accommodate each of the multitude of correlated microservices in the multitude of edge devices and the multitude of mobile computational devices is verified. This is executed by verifying that a remaining energy of each mobile computational device is sufficient to accommodate an execution time of at least one of the microservices, and/or that a bandwidth of a connection between one mobile computational device and at least one neighboring mobile computational device is sufficient for at least one of the microservices to receive an output of one of a precedent microservice. The verifying is not restricted to these two verification steps and can be expanded as desired.

In other words, a microservice is accepted if it can be executed in at least one ad-hoc or edge device. In other words, if there is at least one ad-hoc or edge device that has enough remaining energy to accommodate the execution time of the microservice, and if the bandwidth to at least one neighbor is enough for the microservice to get the output of the precedent microservice, the microservice is accepted. If the microservice cannot be accommodated by at least one ad-hoc or edge device, this microservice is executed in a server, or respectively the cloud. If the microservice can be accommodated in the network, the identifier of the selected ad-hoc or edge devices is included in the microservice entry of the service list.

In a third step, via the SDN controller, a multitude of microservice allocation vectors is created, wherein each microservice allocation vector is assigned to one of the multitude of correlated microservices and to one of the multitude of edge devices or to one of the multitude of mobile computational devices. In other words, after all microservices are verified, the next step consists in creating service allocation vectors for each potential allocation of microservices into devices, as provided in the previous step. This means that each service can be represented based on different resource allocation, described in different service allocation vectors.

In a fourth step, via the SDN controller, a deployment of the multitude of correlated microservices based on a genetic operation is validated via an evolutionary algorithm, in which the service is represented by a multitude of chromosomes. Each chromosome comprises a multitude of genes, wherein in each chromosome, each gene represents one corresponding microservice allocation vector, such that each chromosome is a potential candidate that can allocate the multitude of correlated microservices onto the ad-hoc network topology.

The quality of each chromosome is estimated based on a corresponding fitness value of the evolutionary algorithm, wherein the fitness value corresponds to the total cost of allocation of the multitude of microservices.

In computational intelligence, an evolutionary algorithm is a subset of evolutionary computation, a generic population-based metaheuristic optimization algorithm. An evolutionary algorithm uses mechanisms inspired by biological evolution, such as reproduction, mutation, recombination, and selection. Candidate solutions to the optimization problem play the role of individuals in a population, and a fitness function with a corresponding fitness value determines the quality of the solutions. Evolution of the population then takes place after the repeated application of the above operators. In a genetic algorithm, a subset of evolutionary algorithms, a population of candidate solutions to an optimization problem is evolved toward better solutions. Each candidate solution comprises a set of properties, also referred to as its chromosomes, which can be mutated and altered.

In other words, the evolution usually starts from a population of randomly generated individuals, and is an iterative process, with the population in each iteration called a generation. In each generation, the fitness of every individual in the population is evaluated; wherein the fitness value is usually the value of the objective function in the optimization problem being solved. Thus, the quality of each potential solution, respectively a chromosome, is estimated based on the fitness value of the evolutionary algorithm. The fitness value corresponds to the total cost of allocation of microservices of each service. A higher fitness value represents a lower total energy cost and a better service allocation scheme.

In other words, to solve the problem of energy fair resource allocation of all microservices of all services, an evolutionary algorithm is used, wherein the total population of services is represented by several chromosomes. In each chromosome, each gene represents one service allocation vector as computed before.

Hence, each chromosome can be considered one of the candidates that can allocate the given services onto the ad-hoc-edge network topology.

In a fifth step, via the SDN controller, the elements of the multitude of chromosomes are arranged in descending order according to a corresponding fitness value for each of the multitude of chromosomes.

In a final step, via the SDN controller, a chromosome with the highest fitness value representing an optimized allocation of microservices in the ad-hoc network topology is selected, such that such that a resource consumption in the ad-hoc network is minimized.

Considering the task dependency between multiple devices in the ad-hoc-edge-cloud scenario, the complexity of solving the optimal service allocation strategy is hard to derive in polynomial time. Therefore, this invention proposes a mechanism able to ensure a fair allocation of interconnected microservices based on a bio-inspired approach that reflects the process of natural selection where the fittest individuals are selected. The proposed method based on an evolutionary algorithm allows distributed services to be executed in a full ad-hoc-edge-cloud continuum, in which several microservices can be processed inside ad-hoc networks while keeping the resource levels homogenous in the overall system.

Hence, the method is related to the deployment of services on an ad-hoc cloud, which is made of a set of mobile computational devices with limited resources, such as drones, aircraft or satellites, interconnected in an ad hoc manner, providing services with short latencies, by cooperating in their execution. Such ad-hoc cloud can be connected to edges of a fix network, such as a cellular base station or a satellite ground station, allowing the exploitation of a ad-hoc-edge-cloud continuum to run distributed services able to |process data collected by mobile computational devices.

In other words, the method for optimizing a modification of an ad-hoc-edge network is able to allocate a set of microservices, which define a service, among the devices in an ad-hoc-edge-cloud environment while considering their resource consumption.

Therefore, microservices are allocated to mobile computational devices, which can be drones, HAPS, aircraft, satellites, edge servers, or cloud servers, based on their resources, like energy status, consumption or bandwidth. The allocation of microservices is done in a weighted fair approach, for example in which microservices allocation is directly proportional to the energy status of each device, and inverse proportional to their energy consumption. This means that devices with more energy and with less consumption rates will execute more microservices. For instance, in order to fulfill the required service execution time, the allocation process may also take into account the delay between correlated microservices, keeping as much as possible correlated microservices in nearby devices.

In other words, mobile computational devices with more energy and with less consumption rates may execute more microservices, wherein delay and energy consumption in the ad-hoc network is minimized.

According to one embodiment, the step of verifying further comprises verifying that a storage of each mobile computational device is sufficient to store at least one of the microservices.

According to another embodiment, a part of the multitude of chromosomes with lower fitness value is discarded and a part of the multitude of chromosomes with higher fitness is selected for generating a new generation of a multitude of chromosomes.

According to another embodiment, the new generation of a multitude of chromosomes is generated via a crossover operation. In other words, a two-point crossover method is used for the crossover operation: The chromosomes are randomly selected with a certain crossover probability, and then two crossover points are randomly set at the corresponding position of the selected parent chromosomes.

According to another embodiment, the crossover operation is executed by combining a first chromosome with a second chromosome, wherein a gene of the first chromosome is exchanged with a gene of the second chromosome to create a third chromosome. In other words, the gene fragments from the first crossover point to the second crossover point are exchanged with each other to generate a new pair of chromosomes. Such crossover operation can inherit the characteristics of the parent generation while maintaining the diversity of the evolution.

According to another embodiment, the fitness value of the third chromosome is compared with each of the fitness values of the multitude of chromosomes, and wherein the third chromosome replaces the chromosome with the lowest fitness value. In other words, at the end of the crossover operation, the resource fairness of the newly created chromosome is compared with the fitness value of the parent chromosomes. If the new chromosomes have a higher fairness value, they will replace the chromosome with the lowest fitness/fairness value in the population.

The crossover process is repeated several times based on a random selection of pairs, within the remaining i-iteration chromosomes, excluding the chromosomes resulting from previous crossover operation on the same iteration. After all the crossover operations are done and the new population established, the selection process is repeated based on the fitness value of the chromosomes, leading to a next iteration.

The process ends when a new chromosome has an resource value that is superior to a pre-established threshold. At this point the chromosome with the highest fitness value is selected as representing the best allocation of microservices of all services in the ad-hoc-edge network.

After the establishment of the initial population of chromosomes, a genetic process starts in several interactions, corresponding each iteration to a selection process, in which a chromosome with a higher fitness value is selected for the next generation of the population, while chromosomes with lower fitness value are eliminated. In the i-th iteration/generation, the fitness value of each chromosome is calculated, after which the chromosomes are arranged in descending order according to their fitness value. Then, the latter half of chromosomes with lower fitness values are discarded, and the remaining half of chromosomes with higher fitness values in the population are used in a crossover operation. After the selection process, the remaining chromosomes are used to generate new chromosomes based on a crossover operation that combines two individual chromosomes in different ways to generate a new chromosome aiming to improve the fitness of the new population by retaining the genes with better parents for the next generation, this is by retaining the service combination that lead to a lower energy consumption.

According to another embodiment, the method is executed until a chromosome comprises a fitness value that is higher than a predefined threshold.

According to another embodiment, one of the chromosomes the corresponding multitude of genes is randomly transformed, by randomly changing the edge device or mobile computational device to which one of the microservices is assigned, to generate a mutated chromosome.

In other words, the previously described method may lead to poor evolution if all chromosomes have identical coded information. In this case a mutation process is used to enrich the diversity of new chromosomes. Although the crossover operation expands the search range, it is limited to various combinations of existing genes. The mutation operation makes chromosomes generate new genes, specifically new combinations of microservices allocation inside specific services, introduce new possibilities, and maintain the diversity of the population.

Chromosomes in the population usually mutate with a certain probability. Generally, chromosomes with lower fitness values have a larger mutation probability, while individuals with higher fitness values should have a lower mutation probability. Hence, the mutation process selects several chromosomes from the half group with lower fitness values, in a random manner. Afterwards the service allocation information of each selected chromosome is randomly transformed to cause a mutation in the chromosome. This process is carried out by randomly changing the devices to which the microservices are assigned.

According to another embodiment, the mutated chromosome is selected within a subset of chromosomes with lower fitness.

According to another embodiment, the method is executed until a mutated chromosome comprises a fitness value that is higher than a predefined threshold.

According to another embodiment, if a microservice is unverified, the unverified microservice is executed on a server.

According to another aspect, a system for executing a method for optimizing a modification of an ad-hoc-edge network with a resource-aware service allocation strategy for deployment of a multitude of correlated microservices, which define a service, on an ad-hoc-edge network topology comprising a multitude of edge devices and a multitude of mobile computational devices with limited resources, interconnected in an ad-hoc manner, comprises a processing unit, a multitude of computational devices and a multitude of edge devices.

The processing unit is adapted to process the evolutionary algorithm, wherein the multitude of computational devices are adapted to form an ad-hoc-edge network with an resource-aware service allocation strategy for deployment of a multitude of correlated microservices, which define a service, on an ad-hoc-edge network topology comprising a multitude of edge devices and a multitude of mobile computational devices with limited resources, interconnected in an ad-hoc manner.

According to another embodiment, the multitude of computational devices is selected from at least one of: Drones, UAV, High Altitude Pseudo Satellites, Satellites, Ships, Car, Electric Vehicles or Urban Air Mobility vehicles.

According to another embodiment, the multitude of mobile computational devices are interconnected via radio or optical wireless network links.

In comparison with other approaches that aim to allow an efficient allocation of service tasks between a group of mobile computational devices and a set of edge devices, the method for optimizing a modification of an ad-hoc-edge network with a resource-aware service allocation strategy for deployment of a multitude of correlated microservices, which define a service, on an ad-hoc-edge network topology comprising a multitude of edge devices and a multitude of mobile computational devices with limited resources, interconnected in an ad-hoc manner comprises various benefits. It not only considers direct communication between drones and cloud servers, but also communication between mobile computational devices, in a full ad-hoc-edge-cloud continuum. Furthermore, it considers the resource fairness, for instance energy consumption issues or bandwidth, that are important to improve the lifetime extension of mobile computational devices like flying-based networks, such as drones and HAPS, and the efficiency of flying networks encompassing aircraft and satellites. Furthermore, it ensures the allocation of microservices following a weighted fairness approach, being aware of the resources like energy status and consumption range of the mobile computational devices, for example heterogeneous flying devices.

In this context, a possible scenario assumes an ad-hoc-edge-cloud computing environment encompassing edge and cloud servers that have more computing power than any device in the ad-hoc network. It is also assumed that a cloud server has a better computing performance than an edge server. On the other hand, it is also assumed that edge and cloud servers induce more considerable overall delay to compute data collected from flying devices than when computation is done within the ad-hoc network. In terms of the ad-hoc network, it is assumed that flying devices are interconnected through wireless network links, radio or optical. Several deploying scenarios are possible, such as a drone/aircraft network connected to a set of edge devices via air-to-ground links (e.g. 5G), which are then connected to a cloud infrastructure.

Another scenario can be of a LEO constellation satellite system connected to edge devices collocated with ground stations that provide connectivity to a cloud infrastructure. A last possible scenario is a hybrid one, in which drones, aircrafts and satellites operate as data sources, being drones and aircrafts connected directly to the ground and/or to a satellite network. In this scenario edge devices can be collocated with satellite ground stations as well as cellular base stations.

Hence, the proposed bio-inspiring mechanism aims to allow an SDN controller to estimate the best allocation strategy for all microservices of several services that need to be computed in the ad-hoc-edge-cloud continuum, while minimizing the delay and energy consumption in the ad-hoc network. It is expected that the performance of the proposed mechanism will depend upon several parameters, such as the mutation probability and the amount of genetic interactions, as well as the size of the ad-hoc network.

DETAILED DESCRIPTION

The illustrations in the figures are schematic and not to scale. If the same reference signs are used in different figures in the following description of the figures, they designate identical or similar elements. However, identical or similar elements can also be designated by different reference symbols.

Figure 1:
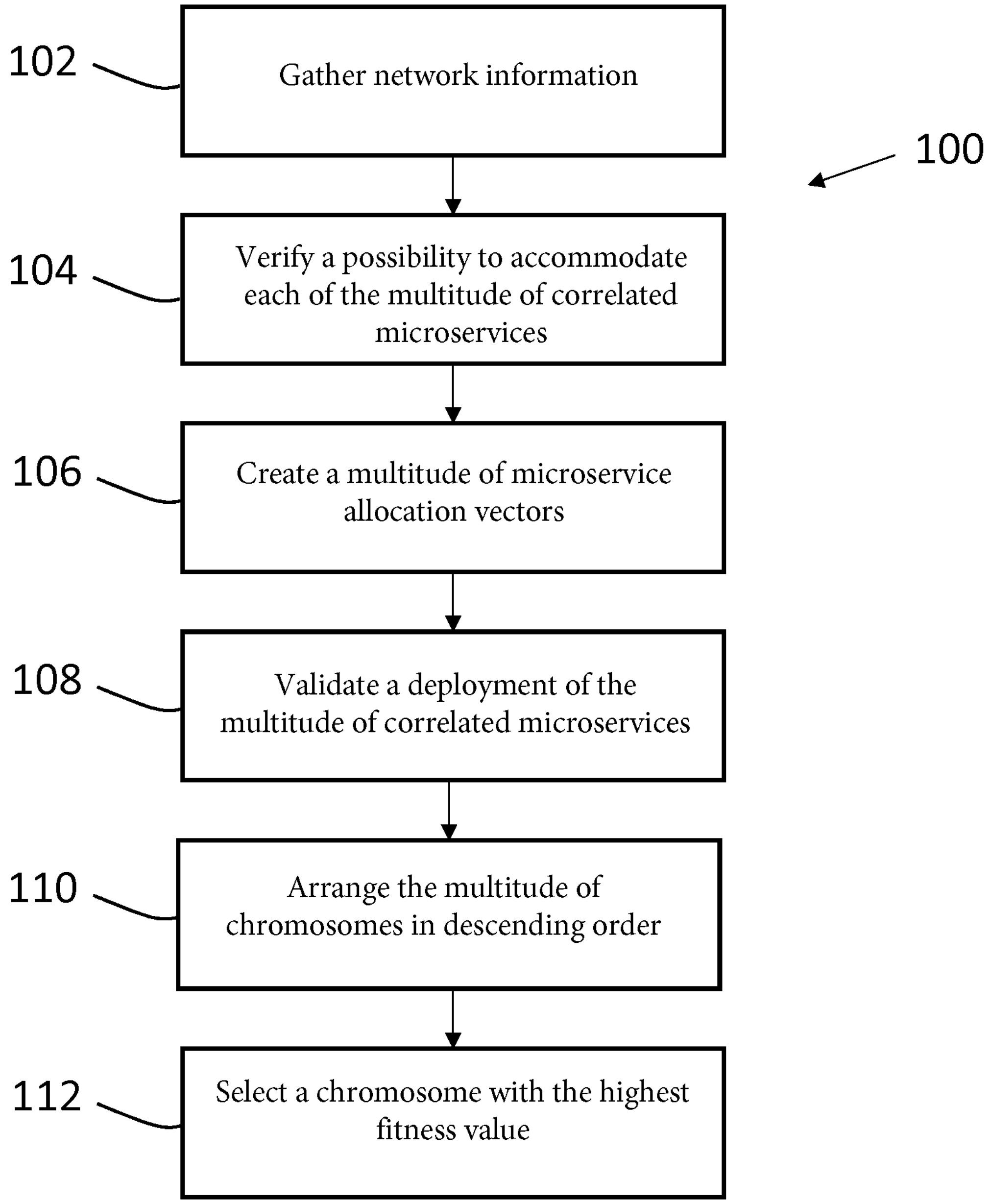
FIG. 1 shows a flowchart of a method for optimizing a modification of an ad-hoc-edge network.

FIG. 1 shows a flowchart of a method 100 for optimizing a modification of an ad-hoc-edge network with a resource-aware service allocation strategy for deployment of a multitude of correlated microservices, which define a service, on an ad-hoc-edge network topology comprising a multitude of edge devices 56 and a multitude of mobile computational devices 54 with limited resources, interconnected in an ad-hoc manner, comprising the following steps:

Gathering 102, via a Software Defined Networking, SDN—, controller, network information of a current status of the ad-hoc-edge network.

Verifying 104, via the SDN controller, a possibility to accommodate each of the multitude of correlated microservices in the multitude of edge devices and the multitude of mobile computational devices, by verifying that a remaining energy of each mobile computational device 54 is sufficient to accommodate an execution time of at least one of the microservices, and/or that a bandwidth of a connection between one mobile computational device 54 and at least one neighboring mobile 54 computational device is sufficient for at least one of the microservices to receive an output of one of a precedent microservice.

Creating 106, via the SDN controller, a multitude of microservice allocation vectors, wherein each microservice allocation vector is assigned to one of the multitude of correlated microservices and to one of the multitude of edge devices or to one of the multitude of mobile computational devices 54.

Validating 108, via the SDN controller, a deployment of the multitude of correlated microservices based on a genetic operation, via an evolutionary algorithm, in which the service is represented by a multitude of chromosomes, each chromosome comprising a multitude of genes, wherein in each chromosome, each gene represents one corresponding microservice allocation vector, such that each chromosome is a potential candidate that can allocate the multitude of correlated microservices onto the ad-hoc network topology, wherein the quality of each chromosome is estimated based on a corresponding fitness value of the evolutionary algorithm, wherein the fitness value corresponds to the total cost of allocation of the multitude of microservices.

Arranging 110, via the SDN controller, the multitude of chromosomes in descending order according to a corresponding fitness value for each of the multitude of chromosomes.

Selecting 112, via the SDN controller, a chromosome with the highest fitness value representing an optimized allocation of microservices in the ad-hoc network topology, such that a resource consumption in the ad-hoc network is minimized.

Figure 2:
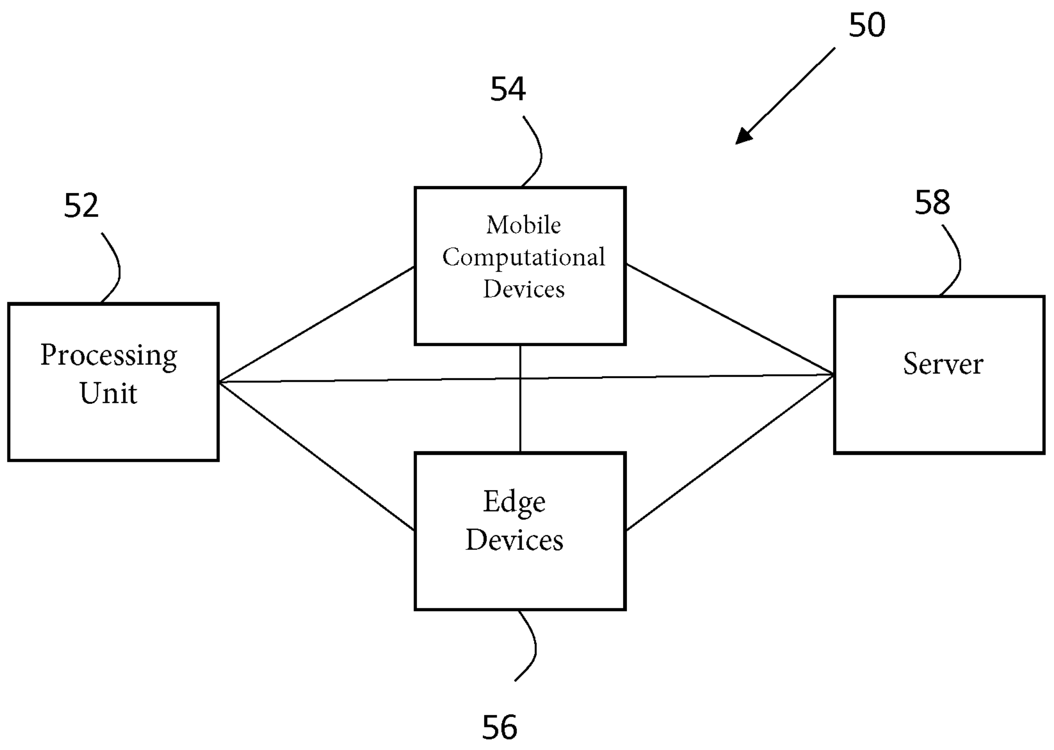
FIG. 2 shows a system for executing a method for optimizing a modification of an ad-hoc-edge network.

FIG. 2 shows a system 50 for executing a method 100 for optimizing a modification of an ad-hoc-edge network with a resource-aware service allocation strategy for deployment of a multitude of correlated microservices, which define a service, on an ad-hoc-edge network topology comprising a multitude of edge devices 56 and a multitude of mobile computational devices 54 with limited resources. The system 50 comprises a processing unit 52 comprising a Software Defined Networking, SDN—, controller, a multitude of mobile computational devices 54 and a multitude of edge devices 56. The processing unit 52 is adapted to process the evolutionary algorithm, wherein the multitude of computational devices 54 are adapted to form an ad-hoc-edge network with an resource-aware service allocation strategy for deployment of a multitude of correlated microservices, which define a service, on an ad-hoc-edge network topology comprising a multitude of edge devices 56 and a multitude of mobile computational devices 54 with limited resources, interconnected in an ad-hoc manner. If a microservice is unverified, the unverified microservice is executed on a server 58.

Hence, it is assumed that in any of the possible deployment scenarios there is connectivity, potentially intermittent, to a control entity in the ground that will execute the proposed genetic algorithm based on information collected from all the devices in the ad-hoc-edge-cloud continuum, as well as the description of services based on a set of microservices.

Such a control entity operates as the Software Defined Networking, SDN—, controller that uses standard protocols to install microservices in different devices in the ad-hoc-edge-cloud continuum.

In other words, the proposed method aims to exploit the resources made available in the ad-hoc-edge-cloud continuum to allocate multiple services as close as possible from the data sources and end-users, in order to reduce latency, while at the same time in a resource weighted fair manner, in order to ensure an extended lifetime and performance of the ad-hoc network. It is assumed that each service consists of multiple correlated microservices, which are constantly or periodically exchanging data. Services can be allocated and executed on each device of the ad-hoc-edge-cloud continuum. Each device consumes a different amount of energy according to the amount of allocated microservices. As more microservices are assigned to a specific device, its energy consumption increases.

Therefore, it is necessary to allocate microservices to each device to equalize the consumption, taking into account device resources like energy status, microservice execution times, bandwidth or other limited resources.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for optimizing a modification of an ad-hoc-edge network with a resource-aware service allocation strategy for deployment of a multitude of correlated microservices defining a service on an ad-hoc-edge network topology including a multitude of edge devices and a multitude of mobile computational devices with limited resources interconnected in an ad-hoc manner, the method comprising:

gathering, via a software defined networking ("SDN") controller, network information of a current status of the ad-hoc-edge network, verifying, via the SDN controller, a possibility to accommodate each of the multitude of correlated microservices in the multitude of edge devices and the multitude of mobile computational devices, by verifying at least one of:

that a remaining energy of each mobile computational device is sufficient to accommodate an execution time of at least one of the microservices, or that a bandwidth of a connection between one of the multitude of mobile computational devices and at least one neighboring mobile computational device is sufficient for at least one of the microservices to receive an output of a precedent microservice, creating, via the SDN controller, a multitude of microservice allocation vectors, wherein each microservice allocation vector is assigned to one of the multitude of correlated microservices and to one of the multitude of edge devices or to one of the multitude of mobile computational devices, validating, via the SDN controller, a deployment of the multitude of correlated microservices based on a genetic operation, via an evolutionary algorithm, in which the service is represented by a multitude of chromosomes, each chromosome comprising a multitude of genes, wherein in each chromosome, each gene represents one corresponding microservice allocation vector, wherein each chromosome is a potential candidate that can allocate the multitude of correlated microservices onto the ad-hoc network topology, wherein the quality of each chromosome is estimated based on a corresponding fitness value of the evolutionary algorithm, wherein the fitness value corresponds to the total cost of allocation of the multitude of microservices, arranging, via the SDN controller, the multitude of chromosomes in descending order according to the corresponding fitness value for each of the multitude of chromosomes, selecting, via the SDN controller, a chromosome of the multitude of chromosomes with the highest fitness value representing an optimized allocation of microservices in the ad-hoc network topology, and allocating, via the SDN controller, the multitude of correlated microservices on the ad-hoc-edge network topology based on the chromosome with the highest fitness value representing an optimized allocation of microservices in the ad-hoc network topology.

2. The method according to claim 1, wherein verifying the possibility to accommodate each of the multitude of correlated microservices in the multitude of edge devices and the multitude of mobile computational devices further comprises verifying: that a storage of each mobile computational device is sufficient to store at least one of the microservices.

3. The method according to claim 1, further comprising:
discarding, via the SDN controller, a part of the multitude of chromosomes with lower fitness values, and
selecting, via the SDN controller, a part of the multitude of chromosomes with higher fitness values for generating a new generation of a multitude of chromosomes.

4. The method according to claim 3, further comprising generating, via the SDN controller, the new generation of the multitude of chromosomes via a crossover operation.

5. The method according to claim 4, further comprising executing, via the SDN controller, the crossover operation by combining a first chromosome with a second chromosome, wherein a gene of the first chromosome is exchanged with a gene of the second chromosome to create a third chromosome.

6. The method according to claim 5, further comprising comparing, via the SDN controller, the fitness value of the third chromosome with each of the fitness values of the multitude of chromosomes, wherein the third chromosome replaces the chromosome with the lowest fitness value.

7. The method according to claim 6, further comprising iteratively executing the method according to claim 6 until a chromosome comprises a fitness value that is higher than a predefined threshold.

8. The method according to claim 1, further comprising generating, via the SDN controller, a mutated chromosome via randomly transforming the corresponding multitudes of genes in one of the chromosomes by randomly changing an edge device or a mobile computational device to which one of the microservices is assigned.

9. The method according to claim 8, further comprising selecting, via the SDN controller, the mutated chromosome within a subset of chromosomes with lower fitness values.

10. The method according to claim 9, further comprising iteratively executing the method according to claim 9 until a mutated chromosome comprises a fitness value that is higher than a predefined threshold.

11. The method according to claim 1, further comprising executing, via the SDN controller, a microservice on a server based on the microservice being unverified.

12. A system comprising a software defined networking controller configured to perform a method for optimizing a modification of an ad-hoc-edge network with a resource-aware service allocation strategy for deployment of a multitude of correlated microservices defining a service on an ad-hoc-edge network topology including a multitude of edge devices and a multitude of mobile computational devices with limited resources interconnected in an ad-hoc manner, the method comprising:
gathering network information of a current status of the ad-hoc-edge network,
verifying a possibility to accommodate each of the multitude of correlated microservices in the multitude of edge devices and the multitude of mobile computational devices by verifying at least one of:
that a remaining energy of each mobile computational device is sufficient to accommodate an execution time of at least one of the microservices, or
that a bandwidth of a connection between one of the multitude of mobile computational devices and at least one neighboring mobile computational device is sufficient for at least one of the microservices to receive an output of a precedent microservice,
creating a multitude of microservice allocation vectors, wherein each microservice allocation vector is assigned to one of the multitude of correlated microservices and to one of the multitude of edge devices or to one of the multitude of mobile computational devices,
validating a deployment of the multitude of correlated microservices based on a genetic operation, via an evolutionary algorithm, in which the service is represented by a multitude of chromosomes, each chromosome comprising a multitude of genes, wherein in each chromosome, each gene represents one corresponding microservice allocation vector, wherein each chromosome is a potential candidate that can allocate the multitude of correlated microservices onto the ad-hoc network topology, wherein the quality of each chromosome is estimated based on a corresponding fitness value of the evolutionary algorithm, wherein the fitness value corresponds to the total cost of allocation of the multitude of microservices,
arranging the multitude of chromosomes in descending order according to the corresponding fitness value for each of the multitude of chromosomes,
selecting a chromosome of the multitude of chromosomes with the highest fitness value representing an optimized allocation of microservices in the ad-hoc network topology, and
allocating the multitude of correlated microservices on the ad-hoc-edge network topology based on the chromosome with the highest fitness value representing an optimized allocation of microservices in the ad-hoc network topology.

13. The system according to claim 12, wherein the multitude of mobile computational devices comprises at least one of: drones, unmanned aerial vehicles (UAVs), high altitude pseudo satellites, satellites, ships, cars, electric vehicles, or urban air mobility vehicles.

14. The system according to claim 13, wherein the multitude of mobile computational devices are interconnected via radio or optical wireless network links.

* * * * *